(12) United States Patent
Bochove

(10) Patent No.: US 7,242,827 B1
(45) Date of Patent: Jul. 10, 2007

(54) WEAK COUPLING BRIDGE FOR OPTICAL FIBER CORES

(75) Inventor: Erik J. Bochove, Corrales, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 107 days.

(21) Appl. No.: 11/264,348

(22) Filed: Oct. 27, 2005

(51) Int. Cl.
G02B 6/02 (2006.01)
(52) U.S. Cl. .............................. 385/30; 385/15; 385/16
(58) Field of Classification Search ................... 385/30, 385/15, 16
See application file for complete search history.

(56) References Cited

U.S. PATENT DOCUMENTS

| 6,031,850 | A | 2/2000 | Cheo | |
| 6,574,409 | B1* | 6/2003 | Moroni et al. | 385/129 |
| 6,972,894 | B2* | 12/2005 | Bjarklev et al. | 359/332 |
| 2002/0048422 | A1* | 4/2002 | Cotteverte et al. | 385/4 |
| 2002/0198281 | A1* | 12/2002 | Dawes et al. | 522/113 |
| 2003/0063884 | A1* | 4/2003 | Smith et al. | 385/129 |
| 2004/0100681 | A1* | 5/2004 | Bjarklev et al. | 359/326 |
| 2004/0175174 | A1* | 9/2004 | Suhami | 398/43 |

OTHER PUBLICATIONS

P.K. Cheo, A. Liu and G. G. King, "A High-Brightness Laser Beam From a Phase-Locked Multicore Yb-Doped Fiber Laser Array," *IEEE Photonics Technology Letters*, vol. 13, No. 5, pp. 439-441, May 2001.

E. J. Bochove, P. K. Cheo and G. G. King, "Self-organization in a multicore fiber laser array," *Optics Letters*, vol. 28, No. 14, pp. 1200-1202, Jul. 15, 2003.

* cited by examiner

*Primary Examiner*—K. Cyrus Kianni
(74) *Attorney, Agent, or Firm*—James M. Skorich

(57) ABSTRACT

A bridge for weakly coupling optical cores in a multicore fiber. An inner cladding surrounds each of the cores. A plurality of bridges laterally connects each of the cores to adjacent cores. The bridges run the length of the fiber. Each bridge enhances the weak evanescent coupling between the cores for frequencies of the light being transmitted by the fiber that are smaller than a cut-off frequency. This permits increased spacing of the cores. This abstract is provided to comply with the rules requiring an abstract, and is intended to allow a searcher or other reader to quickly ascertain the subject matter of the technical disclosure. It is submitted with the understanding that it will not be used to interpret or limit the scope or meaning of the claims.

20 Claims, 2 Drawing Sheets

WEAK COUPLING BRIDGE FOR OPTICAL FIBER CORES

STATEMENT OF GOVERNMENT INTEREST

The invention described herein may be manufactured and used by or for the Government for governmental purposes without the payment of any royalty hereon.

BACKGROUND OF THE INVENTION

The present invention is related to the field of high-power fiber lasers and, more particularly, comprises a structure for providing passive phase synchronization and mode discrimination favoring the in-phase supermode for rare-earth-doped fiber lasers and amplifiers.

Due to their intrinsically single transverse-mode waveguide structure, fiber lasers made from hair-thin high-quality silicate glass are unique in maintaining very high mode quality, even during high-power operation. Moreover, due to their large surface area-to-volume ratio, fiber lasers also possess excellent thermal management properties. Hence, relative to other types of lasers, such devices produce extremely high output beam brightness, defined as the beam power divided by the product of the mode area and the divergence angle of the beam. However, the maximum output power of a single fiber laser is limited by nonlinear optical effects, such as stimulated Brillioun scattering ("SBS") and stimulated Raman scattering ("SRS"), which occur at threshold power levels that decrease as the light intensity increases.

One solution to avoid the foregoing limitation is to increase the modal field cross-sectional area, which permits increasing the power without increasing the peak intensity to either the SBS or SRS threshold value. Another solution is to combine a large number of emitting fibers into an array structure, which is then mutually phased by any one of a number of techniques so that all of the lasers emit in synchronization, to maximize the on-axis light intensity at a great distance. While it is advantageous for high beam quality to place the emitting fibers as close together as possible, heat generation dictates a minimum separation distance for a given number of emitting fibers and operational power level.

The approaches to accomplish the phasing of an array of fibers are classified into active and passive techniques. In the former, fibers are separated by a distance that is much larger than the fiber diameter in order to allow space for auxiliary instrumentation needed for phase locking. Such a configuration is illustrated in FIG. 1, which is a cross-section taken along the output plane of optic fiber array 10 of the prior art. Array 10 is comprised of independent fibers 12, with each fiber including core 14, inner cladding 16, and outer cladding 18. The phasing is performed by taking phase measurements in the output field and adjusting the phase of each emitting fiber 12 by means of a closed electronic feedback loop.

This design minimizes thermal problems, but yields poor beam quality, although the beam quality may be improved with the aid of an array of micro-lenses. The inherent complexity of this approach, due to the necessary free-space optical components, feedback loops, and the micro-lens array, makes for a relatively fragile, bulky structure of potentially low reliability, and one that is expensive to fabricate. Furthermore, since the number of fibers that have been actively combined to date is certainly less than ten, and probably less than five, despite several years of effort and significant expense, reducing this technique to practice appears problematic.

On the other hand, passive phasing of an array occurs automatically and, since feedback loops are not required, its structure can be much more compact, simpler and robust, and its operation much simplified. For example, the in-phase mode in an array may be favored by using spatial filtering in an external cavity, or by cross-coupling using Talbot or self-Fourier transformation optics.

Another passive design of the prior art is an evanescently coupled multicore array, such as optic fiber 20 shown in FIG. 2. Optic fiber 20 is comprised of core array 22, octagonal inner cladding 24, and annular outer cladding 26. The multicore design exemplified by optic fiber 20 is innately robust and compact, and has worked with as many as nineteen cores in core array 22.

These passive techniques allow much closer packing of the cores, resulting in improved beam quality without requiring additional optics. Furthermore, there is no need for the expensive and complex feedback loop required for active phasing. Nevertheless, there are inherent drawbacks associated with the passive phasing techniques of the prior art.

Firstly, the physical mechanism of the phasing is not well understood, creating uncertainty in predictions for large arrays. A nonlinear coupled-mode model used to explain the experimental results obtained from conventional multicore fibers indicated that the presence of a resonant nonlinear index played a decisive role; however, further development of the theory along those lines has shown that competition by anti-phased modes may become more problematic in larger arrays, so that continued success with larger arrays is not assured.

In addition, evanescent field coupling, as used in optic fiber 20, requires relatively close packing of the cores in core array 22. Furthermore, the coupling is affected by the cores' refractive index, the uniformity of the lattice comprising array 22, and the uniformity of the circular shapes and diameters of the cores. While enhancing beam quality, close packing of the cores in core array 22 severely limits the capacity for thermal management.

There is a need in the art to achieve optical gain in rare-earth-doped fiber lasers having the cost, weight, size, and reliability advantages inherent to passive phasing, while operating at high power, maintaining peak intensity below the threshold for the onset of damage or parasitics generated by nonlinear optical interactions, and limiting the temperature within the core regions to a level that does not damage the device's performance. The present invention fulfills this need in the art.

SUMMARY OF THE INVENTION

Briefly, cores in a multicore optic fiber are connected by optical ducts, also referred to as "bridges," made of material having a refractive index that is somewhat higher than that of the inner cladding in which the cores are embedded. The bridges function like wave-guides linking the cores, but with a cut-off frequency that is greater than the frequency of the laser radiation. This enhances the weak coupling between the connected cores through an evanescent field that is sufficient to synchronize the phase of the light in the cores, but not strong enough to possibly induce instabilities in the fundamental (in-phase) mode structure. The bridges are thus capable of strengthening the coupling between the connected cores, even when the distance between them is increased to a large value. Without the bridges, the coupling, i.e., the rate at which light power is transferred between adjacent cores, decreases exponentially with the inter-core distance, limiting that distance to a few core diameters.

The bridges of the present invention allow the distance between adjacent cores to be increased in order to reduce heat generation inside the cores, while maintaining the optical coupling responsible for synchronizing the phasing of the individual core fields. Furthermore, by doping the bridges with the same gain-producing rare-earth ions used in the cores, another mechanism is introduced to favor the in-phase supermode, since anti-phasing would produce minima (nodes) in intensity half-way between cores of opposite phase, thereby resulting in smaller gain for the anti-phase supermodes in comparison to that of the in-phase supermode.

Other aspects and advantages of the present invention will become apparent from the following detailed description, taken in conjunction with the accompanying drawings, and illustrating by way of example the principles of the invention.

DETAILED DESCRIPTION

Figure 1:
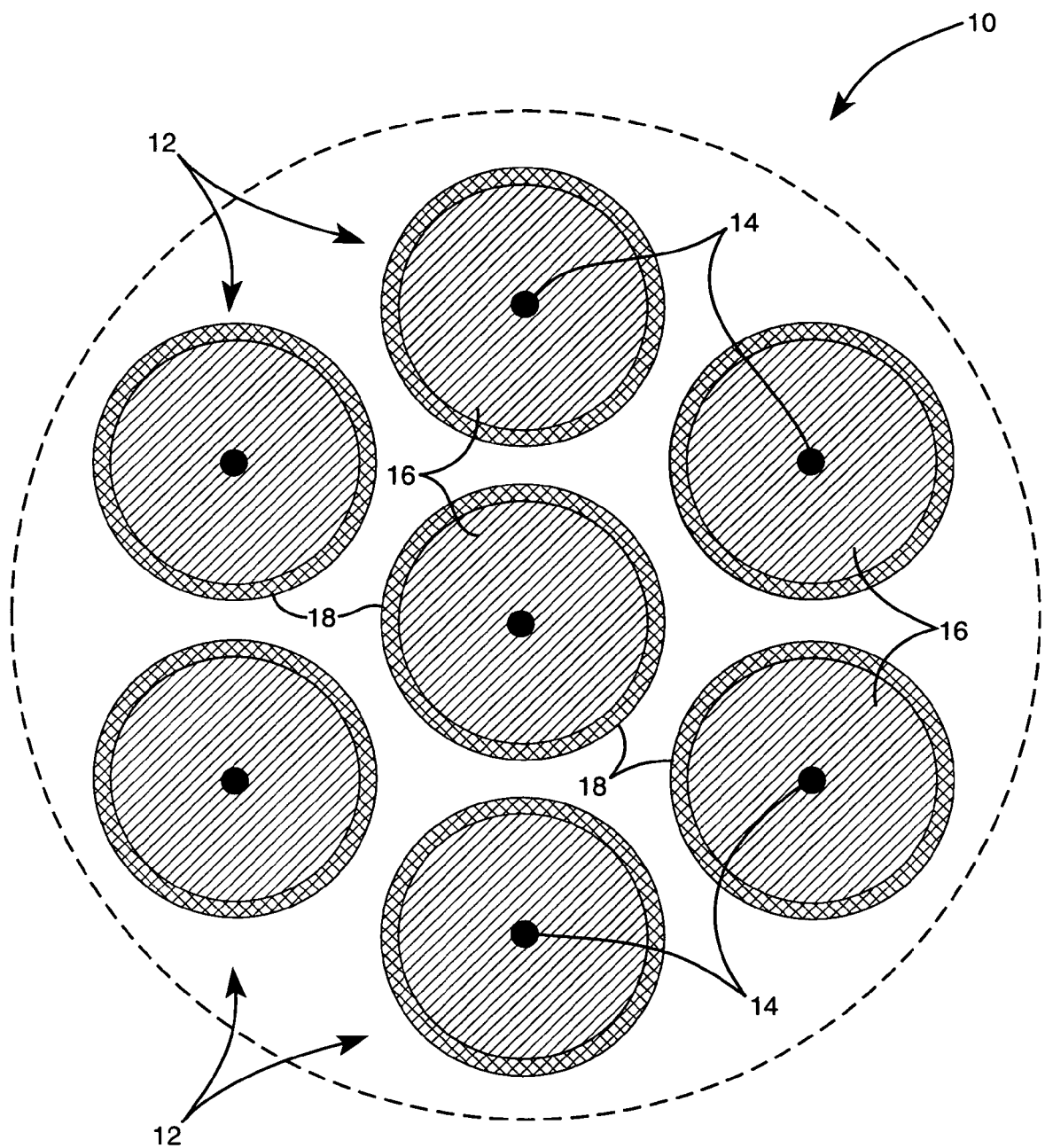
FIG. 1 is a cross-section of an actively phased optic fiber array of the prior art, taken in the plane of the output.
Figure 2:
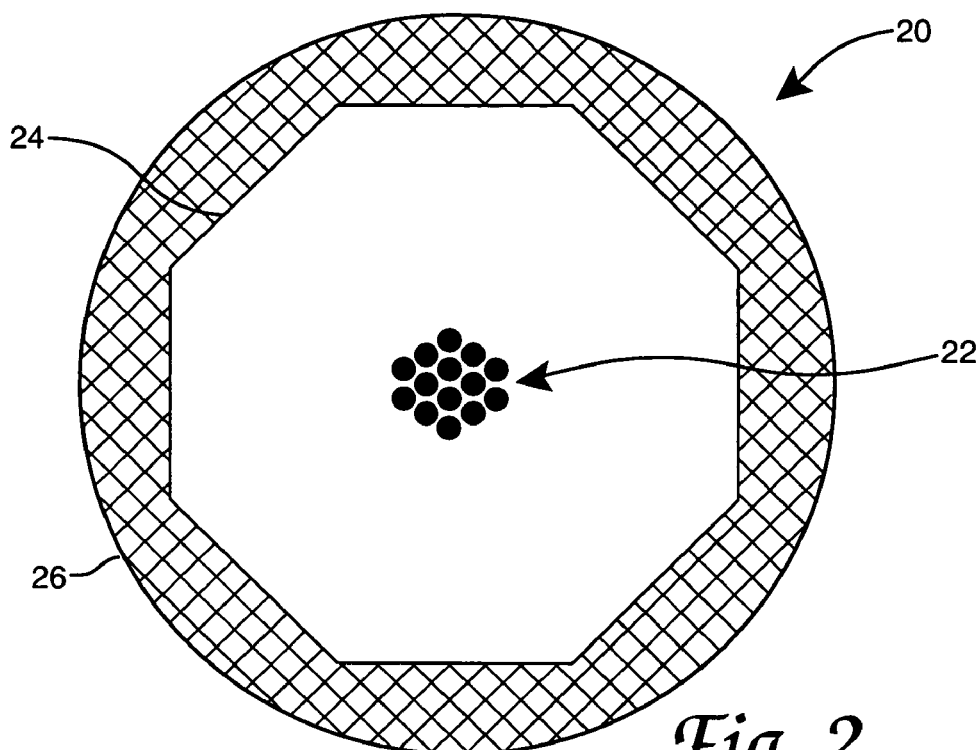
FIG. 2 is a cross-section of a passively phased, evanescently coupled multicore optic fiber of the prior art.
Figure 3:
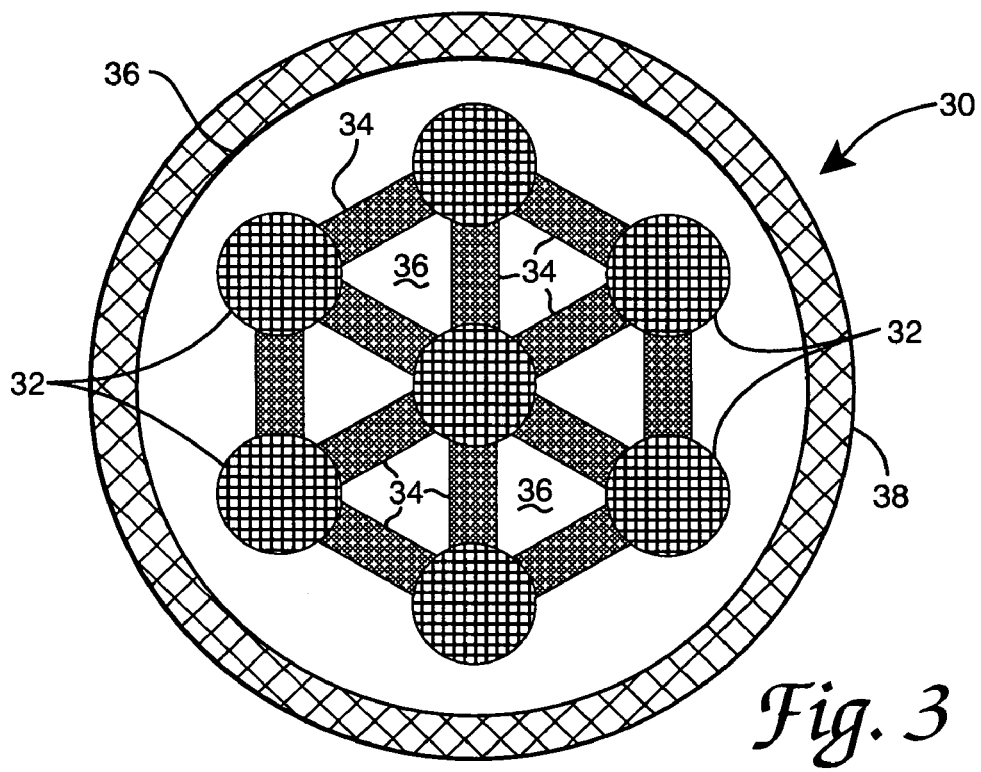
FIG. 3 is a cross-section of a multicore optic fiber of the present invention, comprised of cores connected and coupled by bridges.

FIG. 3 is a cross-section of multicore optic fiber 30 of the present invention. Fiber 30 includes cores 32, bridges 34, inner cladding 36, and outer cladding 38. Each core 32 is laterally connected to adjacent cores 32 by bridges 34. Cores 32 and bridges 34 are embedded in inner cladding 36. Outer cladding 38 circumscribes inner cladding 36.

Each core 32 is a single transverse-mode optical wave-guide consisting of silicate glass within which is dispersed, or "doped," a concentration of ions of one, or more, rare-earth species. This doping achieves a population inversion in each of cores 32 through absorption of radiation emitted by a pump source (not shown), such as an array of semiconductor lasers; also known as "pumping." The pump source is designed to efficiently couple radiation into the pure silicate inner cladding 36 surrounding cores 32.

Outer cladding 38 surrounds inner cladding 36 and is composed of material having a lower refractive index than that of pure silica. Inner cladding 36 thus acts as a guide for the pump radiation. The laser radiation, in turn, is generated by the radiative decay of the excited rare-earth ions, resulting in emission of amplified radiation at the laser frequency into the fundamental mode of each core 32. The wave-guiding action of cores 32 is due to the presence of inactive species of dopants, in addition to the active rare-earth ions. Although this slightly elevates the refractive index, it is kept low enough to ensure that only one transverse mode is guided by cores 32.

Inner cladding 36 serves as a reservoir to store a larger amount of pump radiation than could be stored in the much smaller volume of cores 32. This permits amplification along a greatly increased fiber length, with an attendant increase in power output (currently in the kilowatt range for a single-core fiber). Since outer cladding 38 surrounds inner cladding 36, this type of configuration is commonly called a "double-clad" fiber.

Individual cores 32 are optically robust, single-mode wave-guides. Thus, the higher-order modes must have cut-off wavelengths below the operating wavelength, and any losses due to bends are negligible. These conditions can be satisfied by having the respective magnitudes of the core diameters and their common refractive index lie within the typical ranges for fiber lasers of the prior art. For example, for a laser wavelength of 1080 nm, suitable values for core 32 are approximately 7 μm for its diameter, and a refractive index approximately 0.15% greater than that of inner cladding 36. However, significant variation from these values is permitted, provided the single-mode requirement remains fulfilled.

When conducting light, each of cores 32 is surrounded by an evanescent electro-magnetic field of a magnitude that decreases approximately exponentially in a radial direction away from the core; hence the term "evanescent" field. The evanescent field is thus weakest at a point halfway between two adjacent cores. However, since a small portion of the exponential tails penetrate neighboring cores, cores 32 couple, i.e., exchange radiation through a process sometimes referred to as "tunneling," the rate of which decreases exponentially with the distance between them. While it is desirable to keep the separation distance as low as possible to ensure adequate coupling, thermal management during high power operation may require maintaining a separation distance greater than some minimum. This conflict between these two design constraints is ameliorated by bridges 34 of the present invention, as will be explained infra.

The purpose of bridges 34 is to increase the coupling of laser light between adjacent cores 32 in a controllable way, while simultaneously allowing the spacing between adjacent cores 32 to be increased to avoid overheating. Bridges 34 run axially for the length of fiber 30, and are doped so as to have refractive index that is slightly higher than that of inner cladding 36; whereas there is no requirement as to the refractive index of bridges 34 in relation to that of cores 32. The strength of the coupling between any two adjacent cores 32 is determined by the refractive index of the connecting bridge 34, its length, and its width. It is illuminating to consider bridge 34 as a slab wave-guide operated at a light frequency below its cutoff frequency, as could be determined or set from the foregoing parameters by one skilled in the art of dielectric wave-guide technology. This ensures that coupling between cores 32 is by means of "tunneling."

This "weak" bridge effect allows only a small portion of the light to transfer from one core 32 to another; however, this has the desired effect of synchronizing the phase of the light in each pair of adjacent cores 32 connected by a bridge 34. A well-known analogous effect is "injection locking," whereby multiple independent semiconductor lasers are "locked" to the same frequency and phase by injecting them with a small amount of light from a "master laser." If the bridge's cut-off frequency is set below the laser frequency, the attendant strong coupling i.e., the formation of a "strong" bridge caused by a traveling wave as opposed to an evanescent field, could cause instability in the fundamental (in-phase) mode structure. Experiments have shown that the "weak" bridge of the present invention is capable of achieving phase synchronization in cores 32, so that extension of the present invention to realize the "strong" bridge design will most likely be counterproductive.

There is no limit to the length of bridges 34. The direct coupling of cores 32 by "weak" bridges 34 thus permits much larger spacing between cores 32 than that permitted by the prior art, while keeping the values of the elements of the coupling matrix approximately unchanged (or changing them in a controlled manner, if desired), so that the phasing quality of the structure remains essentially unaltered. The increased spacing allowed by bridges 34 enhances heat dissipation, and thus permits cores 32 to operate at higher power without a concomitant increase in temperature. The span for bridges 34, which need not be the same for all of bridges 34, may be adjusted to optimize beam quality while avoiding thermal problems.

In addition, the radii of cores 32 can be varied so that they progressively increase in proportion to the respective distance from the center of core 32 to the center of fiber 30, to ensure that the peak modal intensity (or peak total power, depending on which is desired) is the same for all of cores 32. With the appropriate choice of "graded" core diameters, a design can be achieved in which peak field intensities are the same for all of cores 32. Furthermore, it is not necessary to have bridges 34 between all adjacent cores 32; by connecting only some of cores 32, alternative supermodes could be realized.

The stronger coupling provided by bridges 34 is expected to favor operation in the in-phase mode even for very large arrays. Also, doping bridges 34 with gain-producing rare-earth ions, the same as in cores 32, would introduce another mechanism favoring the in-phase mode, since anti-phasing would produce minima (nodes) in intensity half-way between cores of opposite phase, thereby resulting in smaller gain for the anti-phase modes.

It is to be understood that the preceding is merely a detailed description of several embodiments of this invention, and that numerous changes to the embodiments can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. An apparatus for passively synchronizing the phase of light in a multicore optical fiber, comprising:
   a multicore optical fiber for transmitting light having a frequency, including a bridge and
   a plurality of optical cores embedded in an inner cladding;
   the bridge extending laterally between the coupled pair of cores;
   the multicore optical fiber having a length:
   the coupled pair of cores and the bridge extending throughout the length of the multicore optical fiber; and
   the bridge being for evanescently coupling light between a pair of the cores, and having a cut-off frequency greater that the frequency of the light being transmitted by the fiber, whereby the light in the cores has a synchronized phase.

2. A passive phase synchronizing apparatus as defined claim 1 wherein:
   the coupled pair of cores lie adjacent to one another.

3. A passive phase synchronizing apparatus as defined in claim 2 wherein:
   the inner cladding has an inner cladding index of refraction;
   the bridge being composed of a material having a bridge index of refraction; and
   the bridge index of refraction is greater than the inner cladding index of refraction.

4. A passive phase synchronizing apparatus as defined in claim 3 further comprising:
   an outer cladding circumscribing the inner cladding; and
   the outer cladding having an index of refraction less than the inner cladding index of refraction.

5. A passive phase synchronizing apparatus as defined in claim 4 wherein the bridge is doped with a gain-producing agent.

6. A passive phase synchronizing apparatus as defined in claim 5 wherein the gain-producing agent includes a rare-earth ion.

7. A passive phase synchronizing apparatus as defined in claim 5 wherein the cores are doped with the gain-producing agent.

8. A passive phase synchronizing apparatus as defined in claim 1 wherein the multicore fiber includes a plurality of the bridges and a plurality of the coupled pairs of cores.

9. A passive phase synchronizing apparatus as defined in claim 8 wherein one of the cores is a member of more than one of the coupled pairs of cores.

10. A passive phase synchronizing apparatus as defined in claim 9 wherein:
    each of the coupled pairs of cores is comprised of a first core and a second core;
    the first core and the second core are separated by a spacing distance; and
    the spacing distance for each of the coupled pairs of cores is the same.

11. A passive phase synchronizing apparatus as defined in claim 10 wherein:
    the bridges evanescently couple each of the cores with at least three of the other cores, whereby
    each of the cores is a member of at least three of the coupled pairs of cores.

12. A passive phase synchronizing apparatus as defined in claim 9 wherein:
    the inner cladding has an inner cladding index of refraction;
    the bridges being composed of a material having a bridge index of refraction; and
    the bridge index of refraction is greater than the inner cladding index of refraction.

13. A passive phase synchronizing apparatus as defined in claim 12 further comprising:
    an outer cladding circumscribing the inner cladding; and
    the outer cladding having an index of refraction less than the inner cladding index of refraction.

14. A passive phase synchronizing apparatus as defined in claim 13 wherein the bridges are doped with a gain-producing agent.

15. A passive phase synchronizing apparatus as defined in claim 14 wherein the gain-providing agent includes a rare-earth ion.

16. A passive phase synchronizing apparatus as defined in claim 14 wherein the cores are doped with the gain-producing agent.

17. A passive phase synchronizing apparatus as defined in claim 9 wherein:
    the multicore optical fiber has an axial centerline extending the length of the multicore optical fiber;
    each of the cores has circular cross-section in a plane lying transverse to the axial centerline, a geometric center lying in the transverse plane, and a radius;
    the geometric center for each of the cores lies at a separation distance from the axial centerline of the multicore optical fiber; and the radius for each core varies in proportion to its separation distance.

18. A passive phase synchronizing apparatus as defined in claim 17 wherein:

the inner cladding has an inner cladding index of refraction;

the bridges being composed of a material having a bridge index of refraction; and the bridge index of refraction is greater than the inner cladding index of refraction.

19. A passive phase synchronizing apparatus as defined in claim 18 wherein the bridges are doped with a gain-producing agent.

20. A passive phase synchronizing apparatus as defined in claim 19 further comprising:

an outer cladding circumscribing the inner cladding; and the outer cladding having an index of refraction less than the inner cladding index of refraction.

* * * * *